United States Patent
Ebe

(10) Patent No.: US 9,185,272 B2
(45) Date of Patent: Nov. 10, 2015

(54) IMAGE PROCESSING METHOD, IMAGE PROCESSING APPARATUS, IMAGE PICKUP APPARATUS, AND STORAGE MEDIUM STORING IMAGE PROCESSING PROGRAM

(71) Applicant: CANON KABUSHIKI KAISHA, Tokyo (JP)

(72) Inventor: Hiroki Ebe, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 106 days.

(21) Appl. No.: 14/081,168

(22) Filed: Nov. 15, 2013

(65) Prior Publication Data

US 2014/0139705 A1    May 22, 2014

(30) Foreign Application Priority Data

Nov. 19, 2012   (JP) ................. 2012-252839

(51) Int. Cl.
| | |
|---|---|
| H04N 5/232 | (2006.01) |
| G06K 9/40 | (2006.01) |
| H04N 5/217 | (2011.01) |
| G06T 5/50 | (2006.01) |
| H04N 5/235 | (2006.01) |
| G06T 5/00 | (2006.01) |

(52) U.S. Cl.
CPC ............. *H04N 5/217* (2013.01); *G06T 5/002* (2013.01); *G06T 5/50* (2013.01); *H04N 5/2356* (2013.01); *H04N 5/23229* (2013.01); *G06T 5/003* (2013.01); *G06T 2200/21* (2013.01); *G06T 2207/10052* (2013.01)

(58) Field of Classification Search
CPC . H04N 5/217; H04N 5/23229; H04N 5/2356; G06T 5/50; G06T 5/002; G06T 5/003; G06T 2207/10052; G06T 200/21

USPC ........... 348/222.1, 234, 345, 349, 350; 382/254, 255, 264, 274, 275
See application file for complete search history.

(56) References Cited

U.S. PATENT DOCUMENTS

| | | | |
|---|---|---|---|
| 8,305,486 B2* | 11/2012 | Mo et al. | 348/351 |
| 8,477,206 B2* | 7/2013 | Hatakeyama | 348/222.1 |

(56) References Cited

| | | | |
|---|---|---|---|
| 2009/0263018 A1* | 10/2009 | Murakami et al. | 382/167 |
| 2012/0154626 A1* | 6/2012 | Hatakeyama et al. | 348/223.1 |

FOREIGN PATENT DOCUMENTS

| | | |
|---|---|---|
| JP | 2003-018438 A | 1/2003 |
| JP | 2009-159357 A | 7/2009 |

OTHER PUBLICATIONS

Ren Ng, et al. "Light Field Photography with a Hand-held Plenoptic Camera" Standford Tech Report CTSR 2005-02. Apr. 2005.

* cited by examiner

*Primary Examiner* — Sinh Tran
*Assistant Examiner* — Mark Monk
(74) *Attorney, Agent, or Firm* — Rossi, Kimms & McDowell LLP

(57) ABSTRACT

The image processing method includes acquiring an input image produced by an image pickup system including at least one imaging optical system and causing light rays from a same point in an object space to respectively enter different image pickup pixels depending on light ray passing areas of a pupil through which the respective light rays pass, performing a shaping process including at least one of an image restoration process to restore a degraded image and a luminance estimation process to estimate a luminance of a saturated area, a reconstruction process to reconstruct a new image different from the input image, and performing a blur addition process to add an image blur component to an addition target image. The method performs the shaping process before the reconstruction process and the blur addition process.

9 Claims, 13 Drawing Sheets

IMAGE PROCESSING METHOD, IMAGE PROCESSING APPARATUS, IMAGE PICKUP APPARATUS, AND STORAGE MEDIUM STORING IMAGE PROCESSING PROGRAM

BACKGROUND OF THE INVENTION

1. Field of the Invention

The present invention relates to an image processing technique to reconstruct various images using light ray information obtained by image capturing and output reconstructed images.

2. Description of the Related Art

Performing image capturing by introducing light from an imaging optical system to an image sensor through a microlens array or by using a combination of the imaging optical system and the image sensor (that is, an image pickup apparatus) can provide light ray information including intensities or directions of light rays from respective points in an object space. An image processing technique has been proposed which reconstructs, by using the light ray information, an image on which adjustment of a focus position, a depth of field or a viewpoint direction is performed. Ren Ng and seven others, "light field photography with a hand-held plenoptic camera", Stanford Tech Report CTSR 2005-02A discloses a method "Light Field Photography" that acquires information on positions and angles (directions) of light rays from an object and reconstructs an image focused on an arbitrary position or an image viewed from an arbitrary viewpoint direction using the acquired information.

In general, image capturing using a wide-angle lens or image capturing using an image pickup apparatus with a small image sensor can provide, due to its short focal length, an image with a large depth of field (that is, an entirely in-focus image). In addition, image capturing with a narrowed aperture also can provide an image with a large depth of field. An image process (hereinafter referred to as "a blur addition process") is sometimes performed on such images to intentionally add a blur (image blur component) thereto in order to emphasize a main object or soften atmosphere of the image.

Blurs appearing in images include a blur caused by defocus generated due to a position of an object whose distance is different from an in-focus distance and a blur caused by aberration or diffraction in an optical system. The above-mentioned blur which is intentionally added to the image is the blur caused by defocus (hereinafter simply referred to as "a blur" or "a defocus blur").

Japanese Patent Laid-Open No. 2009-159357 discloses a technique which introduces light from an imaging optical system to an image sensor through a microlens array to obtain data of multiple pixels and performs weighting on the data corresponding to viewpoint directions to reconstruct an image in which a depth of field is adjusted or an image in which various blurs are expressed. Japanese Patent Laid-Open No. 2003-18438 discloses an image pickup apparatus which acquires images having different blurs added thereto at a same time using multiple cameras having imaging optical systems with different optical characteristics.

The technique disclosed in Japanese Patent Laid-Open No. 2009-159357 controls a shape of the blur in the reconstruction to express the various blurs. The technique disclosed in Japanese Patent Laid-Open No. 2003-18438 expresses the different blurs on a basis of image information obtained by the multiple cameras. However, in Japanese Patent Laid-Open Nos. 2009-159357 and 2003-18438, a size of the blur to be expressed is defined depending on an F-number of the imaging optical system, and a blur addition process as an image process to add to an image a blur whose size corresponds to an F-number smaller than the F-number of the imaging optical system is not disclosed.

Moreover, the blur addition process has the following problems. A first problem is caused by an optical characteristic of an imaging optical system. An image obtained by image capturing includes more than a little blur caused by the above-mentioned aberration or diffraction in the imaging optical system, regardless of a defocus amount, a size of an image sensor and a focal length. Adding the defocus blur to such an image including the blur caused by the aberration or diffraction makes it difficult to express a natural blur.

For example, when a defocus blur with a circularly symmetric shape is added to an image of an object as a point light source shown in FIG. 18A, a natural blur is obtained as shown in FIG. 18B. However, for example, when the circularly symmetric defocus blur is added to an image in which a blur occurs due to coma aberration as shown in FIG. 18C, an unnatural blur is obtained as shown in FIG. 18D.

A second problem arises when a blur is added to a luminance saturated area. FIG. 19A shows a luminance distribution of one section of the luminance saturated area. A saturation value in FIG. 19A is a maximum luminance value which can be expressed by a digital image. When a blur is added to the luminance saturated area shown in FIG. 19A, a gentle curve-shaped luminance distribution shown in FIG. 19B is obtained. FIG. 19C shows a luminance distribution of an image captured under a condition that an F-number is less than that shown in FIG. 19A. The luminance distribution of the blur shown in FIG. 19B is less than that shown in FIG. 19C. That is, it is impossible to express a blur in the luminance saturated area of the image captured under the condition that the F-number is small, only by adding the blur to the luminance saturated area.

BRIEF SUMMARY OF THE INVENTION

The present invention provides an image processing method and an image processing apparatus capable of adding a good blur when reconstructing an image by using light ray information obtained by image capturing.

The present invention provides as an aspect thereof an image processing method including acquiring an input image produced by an image pickup system including at least one imaging optical system and causing light rays from a same point in an object space to respectively enter different image pickup pixels depending on, of a pupil plane of the at least one imaging optical system, light ray passing areas through which the respective light rays pass, performing a shaping process including at least one of an image restoration process to restore a restoration target image on a basis of an optical transfer function of the image pickup system and a luminance estimation process to estimate a luminance value in a luminance saturated area in an estimation target image, performing a reconstruction process to reconstruct a new image different from the input image, and performing a blur addition process to add an image blur component to an addition target image. The method performs the shaping process before the reconstruction process and the blur addition process.

The present invention provides as another aspect thereof an image processing apparatus performing an image process on an input image. The input image is produced by an image pickup system including at least one imaging optical system and causing light rays from a same point in an object space to respectively enter different image pickup pixels depending on, of a pupil plane of the at least one imaging optical system, light ray passing areas through which the respective light rays pass. The image process includes a shaping process including at least one of an image restoration process to restore a restoration target image on a basis of an optical transfer function of the image pickup system and a luminance estimation process to estimate a luminance value in a luminance saturated area in an estimation target image, a reconstruction process to reconstruct a new image different from the input image, and a blur addition process to add an image blur component to an addition target image. The image process performs the shaping process before the reconstruction process and the blur addition process.

The present invention provides as still another aspect thereof an image pickup apparatus including an image pickup system including at least one imaging optical system and configured to cause light rays from a same point in an object space to respectively enter different image pickup pixels depending on, of a pupil plane of the at least one imaging optical system, light ray passing areas through which the respective light rays pass, and the above image processing apparatus.

The present invention provides as yet still another aspect thereof a non-transitory storage medium storing an image processing program as a computer program to cause a computer to perform an image process on an input image. The input image is produced by an image pickup system including at least one imaging optical system and causing light rays from a same point in an object space to respectively enter different image pickup pixels depending on, of a pupil plane of the at least one imaging optical system, light ray passing areas through which the respective light rays pass. The image process includes a shaping process including at least one of an image restoration process to restore a restoration target image on a basis of an optical transfer function of the image pickup system and a luminance estimation process to estimate a luminance value in a luminance saturated area in an estimation target image, a reconstruction process to reconstruct a new image different from the input image, and a blur addition process to add an image blur component to an addition target image. The image process performs the shaping process before the reconstruction process and the blur addition process.

Other aspects of the present invention will be apparent from the embodiments described below with reference to the drawings.

DETAILED DESCRIPTION OF THE EMBODIMENTS

Exemplary embodiments of the present invention will be described below with reference to the accompanied drawings.
[Embodiment 1]

Figure 1:
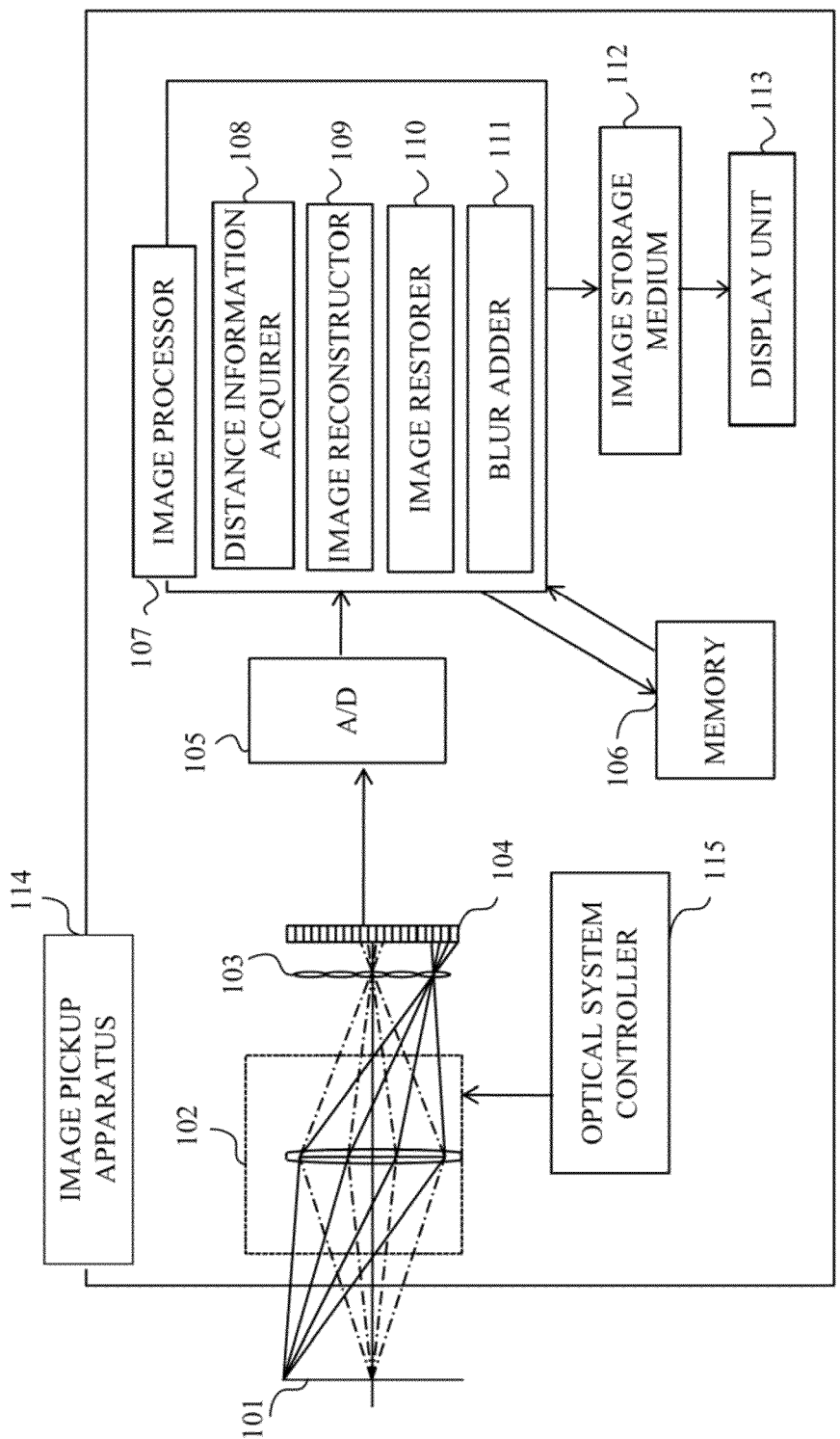
FIG. 1 is a block diagram showing a configuration of an image pickup apparatus including an image processing apparatus that is Embodiment 1 of the invention.

FIG. 1 shows a configuration of an image pickup apparatus 114 including an image processor 107 as an image processing apparatus that is a first embodiment (Embodiment 1) of the present invention. Reference numeral 101 is an object plane (object space). A person or a thing is not necessarily present on the object plane 101. This is because it is possible to produce an image focused on a person or a thing disposed farther or nearer than the object surface 101 by a reconstruction process after imaging capturing. This is the same in other embodiments described later.

Reference numeral 102 is an imaging optical system (image pickup optical system). Reference numeral 103 is a lens array including a plurality of microlenses. The lens array 103 is disposed at an image side conjugate plane of the imaging optical system 102 with respect to the object surface 101 and serves as a pupil divider which divides a pupil (exit pupil) of the imaging optical system 102. The exit pupil of the imaging optical system 102 and an image sensor 104 have a conjugate relation provided by the lens array 103. The image sensor 104 is a photoelectric conversion element such as a CMOS sensor or a CCD sensor and includes a plurality of pixels (image pickup pixels).

In this embodiment, the lens array 103 is used as the pupil divider. However, an element, such as a pinhole array, which is different from the lens array, may be used as the pupil divider. In addition, a plurality of lens arrays may be used as the lens array 103. In this embodiment, a solid lens is used. However, various lenses, such as a liquid lens, a liquid crystal lens and a diffractive optical element, can be used.

Reference numeral 115 is an optical system controller that changes a focal length or an aperture value of the imaging optical system 102 or controls focusing.

Light rays from the object surface 101 pass through the imaging optical system 102 and the lens array 103 to enter different pixels of the image sensor 104 depending on positions and angles of the light rays on the object surface 101. The lens array 103 causes light rays from a same position (same point) on the object surface 101 to enter different pixels of the image sensor 104, without causing the light rays to enter a same pixel. That is, the lens array 103 causes the light rays from the same point in the object space to enter different image pickup pixels depending on ray passing areas in a pupil plane of the imaging optical system 102. In addition, the lens array 103 also causes light rays from different positions on the object plane 101 to enter different pixels of the image sensor 104. The image sensor 104 performs photoelectric conversion of the light rays to provide information on a position and a direction (angle) of each light ray.

An analog electric signal output from the image sensor 104 is converted into a digital signal by an A/D converter 105, and the digital signal is input to an image processor 107. The image processor 107 produces, from light ray information that is the information on the position and direction (angle) of each light ray, an image in which pixel groups viewing a same area on the object plane 101 from multiple viewpoints are arranged, that is, an input image as image data including parallax information. The imaging optical system 102, the lens array 103 and the image sensor 104 (in addition, a portion of the image processor 107 which produces the input image) constitute an image pickup system.

Moreover, the image processor 107 reads various kinds of information stored in a memory 106. The various kinds of information include information on optical characteristics of the image pickup system (of the imaging optical system 102 and the lens array 103) and information on image pickup conditions such as information on the aperture value and focal length of the imaging optical system 102 and information on exposure. The various kinds of information further include information on an image restoration filter described later. The image processor 107 may acquires such various information from outside the image pickup apparatus 114 if necessary, without reading it from the memory 106.

The image processor 107 includes a distance information acquirer 108, an image reconstructor 109, an image restorer 110 and a blur adder 111, each of which performs the following process. An image on which the processes have been performed by the image processor 107, that is, a reconstructed image to which "a blur" (described later) is added is stored in an image storage medium 112 such as a semiconductor memory, or is displayed on a display unit 113 constituted by a liquid crystal display or the like.

Next, description will be made of an image restoration process performed in this embodiment. An optical transfer function (OTF) obtained by performing Fourier transform on a point spread function (PSF) is frequency component information of aberration and diffraction, which is expressed by complex number. An absolute value of the optical transfer function (OTF), that is, an amplitude component is called a modulation transfer function (MTF) and a phase component is called a phase transfer function (PTF). The MTF and PTF are respectively a frequency characteristic of the amplitude component of the image degradation and a frequency characteristic of the phase component of image degradation caused by the aberration and diffraction. In this embodiment, the phase component is a phase angle and is represented by the following expression:

$$PTF = \tan^{-1}(Im(OTF)/Re(OTF))$$

where Re(OTF) and Im(OTF) respectively represent a real part of the OTF and an imaginary part thereof.

Thus, the optical transfer function (OTF) of the optical system included in the image pickup system degrades the amplitude component and the phase component of the image. Therefore, respective points of the object in the degraded image are asymmetrically blurred like coma aberration.

As a method for correcting, in a degraded image (input image), degradation of the amplitude component (MTF) and degradation of the phase component (PTF) in the degraded image, a method has been known which uses information on the optical transfer function of the optical system. This method is called image restoration or image recovery. A process for correcting the degraded image (reducing the degradation component) by using the information on the optical transfer function of the optical system is referred to as "an image restoration process" (or simply referred to as "a restoration process").

When g(x, y) represents an input image (degraded image) produced by image capturing using an optical system, f(x,y) represents a non-degraded original image, h(x,y) represents a point spread function (PSF) that forms a Fourier pair with the optical transfer function (OTF), * represents convolution, and (x,y) represents coordinates (position) on the image, the following expression is established:

$$g(x,y) = h(x,y) * f(x,y).$$

Converting the above expression into a display form of a two-dimensional frequency surface provides the following expression of a form of a product for each frequency:

$$G(u,v) = H(u,v) \cdot F(u,v)$$

where H represents a result of Fourier transform of the point spread function (PSF), which corresponds to the optical transfer function (OTF), G and F respectively represent results of Fourier transform of g and h, and (u,v) represents coordinates on the two-dimensional frequency surface, in other words, a frequency.

Dividing both sides of the above expression by H as below makes it possible to acquire the original image from the degraded image:

$$G(u,v)/H(u,v) = F(u,v).$$

Returning this F(u,v), that is, G(u,v)/H(u,v) to a real surface by inverse Fourier transform thereof provides a restored image equivalent to the original image f(x, y).

When R represents a result of the inverse Fourier transform of $H^{-1}$, performing a convolution process on an image in the real surface as expressed by the following expression also enables providing the original image:

$$g(x,y) * R(x,y) = f(x,y).$$

This R(x,y) is the image restoration filter. When the input image is a two-dimensional image, the image restoration filter is generally also a two-dimensional filter having taps (cells) corresponding to pixels of the two-dimensional image. Moreover, in general, as number of the taps (cells) in the image restoration filter increases, image restoration accuracy improves, so that a realizable number of the taps is set depending on a requested image quality, an image processing capability, aberration and diffraction characteristics of the optical system and the like.

Since the image restoration filter needs to reflect at least the aberration and diffraction characteristics, the image restoration filter is entirely different from a conventional edge enhancement filter (high-pass filter) having about three taps in each of horizontal and vertical directions. Since the image restoration filter is produced based on the optical transfer function (OTF) including information on the aberration and diffraction, degradation of amplitude and phase components of the degraded image (input image) can be highly accurately corrected.

Since a real image includes a noise component, using an image restoration filter produced from the complete inverse number of the optical transfer function (OTF) as described above amplifies the noise component together with the degraded image, which generally makes it impossible to provide a good restored image. This is because such an image restoration filter raises the MTF (amplitude component) of the optical system to 1 over an entire frequency range in a state where amplitude of the noise component is added to the amplitude component of the image. Although the MTF degraded by the optical system is returned to 1, power spectrum of the noise component is simultaneously raised, which results in amplification of the noise component according to a degree of raising of the MTF, that is, a restoration gain.

Therefore, the noise component makes it impossible to provide a good image for appreciation. Such raising of the noise component can be expressed by the following expressions where N represents the noise component:

$$G(u,v) = H(u,v) \cdot F(u,v) + N(u,v)$$

$$G(u,v)/H(u,v) = F(u,v) + N(u,v)/H(u,v)$$

As a method for solving such a problem, there is known, for example, a Wiener filter represented by the following expression (1), which controls the restoration gain according to an intensity ratio (SNR) of an image signal and a noise signal.

$$M(u,v) = \frac{1}{H(u,v)} \frac{|H(u,v)|^2}{|H(u,v)|^2 + SNR^2} \quad (1)$$

In expression (1), M(u,v) represents a frequency characteristic of the Wiener filter, and |H(u,v)| represents an absolute value (MTF) of the optical transfer function (OTF). This method decreases the restoration gain as the MTF is lower, in other words, increases the restoration gain as the MTF is higher. The MTF of the optical system is generally high on a low frequency side range and low on a high frequency side range, so that the method resultantly suppresses the restoration gain on the high frequency side range of the image signal.

The image restoration filter will be described with reference to FIG. 14. For the image restoration filter, the number of taps is decided depending on the aberration and diffraction characteristics of the optical system and a required image restoration accuracy.

Figure 14A:
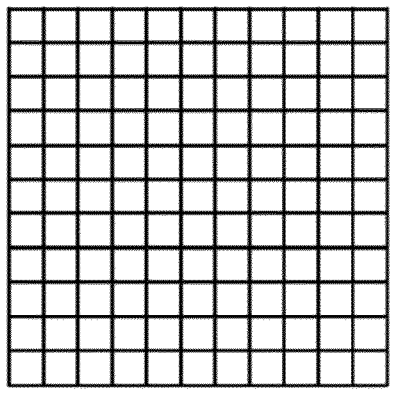
FIGS. 14A and 14B show an image restoration filter used for the image restoration process.
Figure 14B:
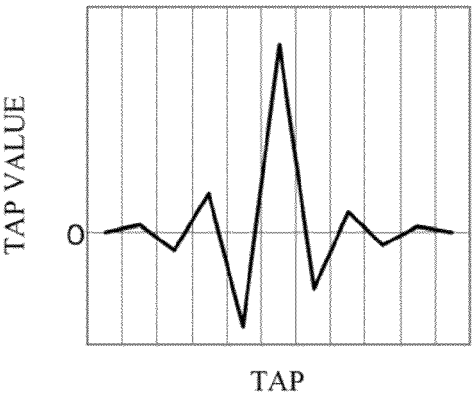

FIG. 14A shows, as an example, a two-dimensional image restoration filter including 11×11 taps. In FIG. 14A, tap values (coefficients), each of which is a value in each tap, are not shown. FIG. 14B shows one section of the image restoration filter and shows an example of the tap values of the image restoration filter; each tap value being set on a basis of information of various aberrations and diffraction of the optical system. This distribution of the tap values of the image restoration filter returns signal values (PSF) spatially spread due to the aberration and diffraction to, ideally, one original point.

In the image restoration process, convolution of each tap value of each tap of the image restoration filter is performed on each pixel of the input image corresponding to that tap. In the convolution process, in order to improve a signal value of a certain pixel in the input image, that pixel is matched to a center tap of the image restoration filter. Then, a product of the signal value of the input image and the tap value (coefficient) of the image restoration filter is calculated for each corresponding pixel and tap, and the signal value of the center pixel is replaced by a total sum of the products.

Performing the convolution of such an image restoration filter in a real space on the input image makes it possible to perform the image restoration, without performing Fourier transform or inverse Fourier transform on the image in the image restoration process.

The image restoration filter can be produced by inverse Fourier transform of a function designed on a basis of an inverse function of the optical transfer function (OTF) of the optical system. For example, the inverse Fourier transform of the Wiener filter enables producing an image restoration filter actually convoluted to the input image in the real space.

The optical transfer function (OTF) changes depending on image heights (positions on the image) of the optical system even if the image pickup condition is same. Therefore, the image restoration filter to be used is changed depending on the image height.

Figure 18A:
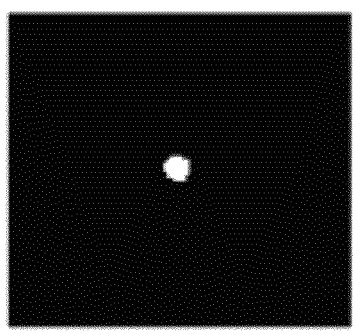
FIGS. 18A to 18D show problems when a blur is added to an object image changed depending on an optical characteristic of an imaging optical system.
Figure 18B:
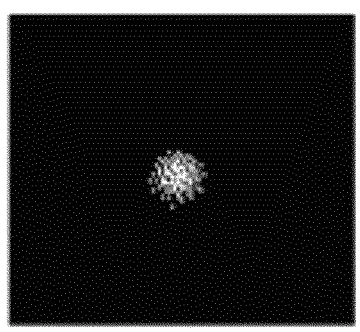
Figure 18C:
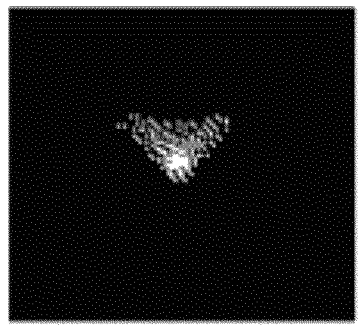
Figure 18D:
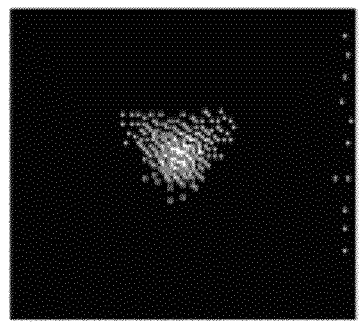

Next, description will be made of an image restoration filter which is used in this embodiment and particularly has a function of improving symmetry of aberration. As understood from expression (1), a portion of rOTF in the following expression (2) corresponds to a frequency characteristic of an restored image which is an image after the image restoration on an input image obtained by capturing a point light source shown in FIG. 18A.

$$M(u,v) = \frac{1}{H(u,v)}[rOTF] \quad (2)$$

In expression (2), rOTF represents an arbitrary function. Since the phase degradation component of the restored image is desirable to be zero, rOTF is enough to have no phase component. Since rOTF includes only a real part, it is substantially equal to rMTF. Although rOTF is desirable to have only a real part, rOTF may have a value of an imaginary part within an allowable range. In other words, it is enough that it is possible to acquire an image as if produced by image capturing of not only the point light source but also any other objects through an optical system (that is, the imaging optical system 102 and the lens array 103) whose optical transfer function (OTF) has a characteristic corresponding to rOTF.

Accordingly, this embodiment changes expression (2) to the following expression (3) using a common OTF(rH(u,v)) between in azimuth directions which are orthogonal to a principal ray (a light ray passing through a center of the imaging optical system). Using expression (3) makes it possible to acquire an image as if produced by image capturing through an optical system whose MTFs have no different between in the azimuth directions.

$$M(u,v) = \frac{1}{H(u,v)} \frac{|rH(u,v)|^2}{|rH(u,v)|^2 + SNR^2} \quad (3)$$

Figure 16A:
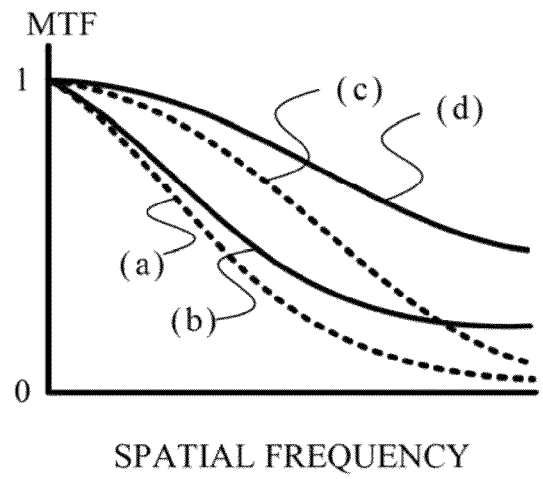
FIGS. 16A and 16B show an image restoration process using a Wiener filter.
Figure 16B:
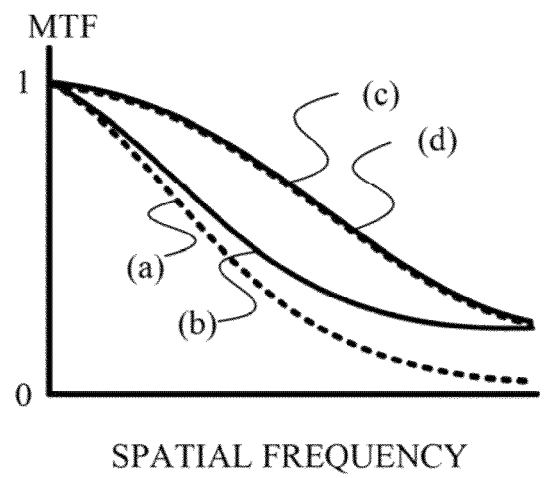

The above effect will be described with reference to FIGS. 16B. MTFs (a) and (b) in different azimuth directions before image restoration are different from each other. However, MTFs (c) and (d) in the different azimuth directions after the image restoration are identical to each other. The MTFs (a) and (b) shown in FIG. 16B correspond to, for example, MTFs in a meridional direction and a sagittal direction. Thus, the image restoration filter used in this embodiment enables performing the image restoration while correcting the difference in MTF between in the azimuth directions.

Figure 13:
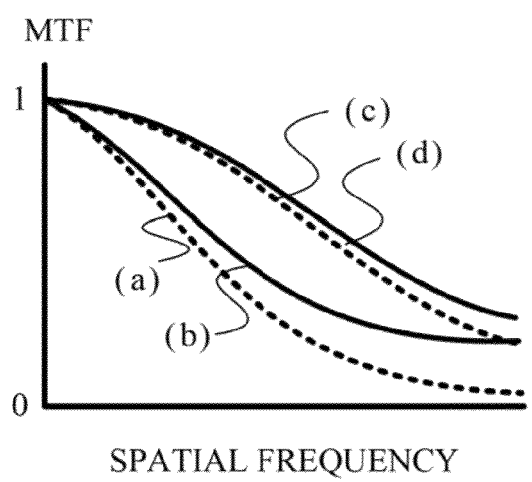
FIG. 13 shows an MTF relating to an image restoration process.

Although in expression (3) the common OTF(rH(u,v)) is used between in the azimuth directions, correcting rH(u,v) so that a difference in OTF between in the azimuth directions becomes smaller than that before the image restoration enables controlling rotational symmetry. FIG. 13 shows an example in which the rotational symmetry is not perfectly corrected. Although MTFs (c) and (d) in the different azimuth directions shown in FIG. 13 are not perfectly identical to each other, the correction makes a different therebetween smaller than that between the MTFs (c) and (d) in FIG. 16A, and thereby asymmetry of the PSF is reduced. In order to obtain such an asymmetric correction effect, it is desirable to control at least the difference in MTF between in the azimuth directions after the image restoration to be smaller than that before the image restoration.

Since H(u,v) in expression (3) changes depending on the azimuth direction, the image restoration filter has, regardless of whether or not rH(u,v) is common between in the azimuth directions, an asymmetric coefficient arrangement. In other words, the tap values in the section shown in FIG. 14B change depending on the azimuth direction.

Moreover, the optical transfer function (OTF) can include not only the aberration and diffraction of the imaging optical system 102 and the lens array 103, but also a factor which degrades the optical transfer function (OTF) in an image pickup process. For example, an optical low-pass filter having birefringence suppresses a high-frequency component with respect to frequency characteristics of the optical transfer function (OTF). In addition, a shape of a pixel aperture, an aperture ratio and vignetting in the image sensor 104 influence the frequency characteristics. Furthermore, spectral characteristics of a light source and spectral characteristics of various types of wavelength filters influence the frequency characteristics. It is desirable to produce the image restoration filter on a basis of a broad-sense optical transfer function (OTF) including the above-mentioned factors. Moreover, the taps of the image restoration filter are not necessarily squarely arranged, the arrangement of the taps can be arbitrarily changed as long as it is considered in a convolution process of the image restoration filter.

Since the image restoration process can perform processes for restoration of the degraded image to an original image more accurately when an image degradation process is linear, as compared with a case where the image degradation process is non-linear, it is desirable that the input image be not subjected to a non-linear process. Therefore, it is desirable that the image restoration process be performed on a mosaic image (RAW image). However, it is possible to similarly perform the image restoration process on a demosaic image if its image degradation process by a color interpolation process is linear, as long as a degradation function of the image degradation process is considered when the image restoration filter is produced. In addition, when a required accuracy of the image restoration is low or when it is difficult to acquire an image subjected to various image processes, the image restoration process may be performed on a demosaic image. The image processing method used in this embodiment can be applied to any input image, regardless of whether it is a mosaic image or a demosaic image.

Description will be made of an image process (image processing method) that is performed in this embodiment and produces a blur added image, which is an image to which an image blur component (hereinafter simply referred to as "a blur") is added, from the input image, with reference to a flowchart shown in FIG. 2. The image processor 107 as a computer executes this image process according to an image processing program, which is a computer program.

At step S011, the image processor 107 acquires an input image. In this embodiment, the input image is an image produced by the image pickup system that causes light rays from each point (each of same points) on the object plane 101 to enter different image pickup pixels depending on ray passing areas of the pupil plane of the imaging optical system 102. The input image includes information on directions of the light rays from each point on the object plane 101. In other words, the input image is an image in which pixel groups produced by viewing the object plane 101 from multiple viewpoints (that is, in which multiple small images whose viewpoints are mutually different) are arranged; the input image includes parallax information.

At step S012, the distance information acquirer 108 of the image processor 107 acquires distance information of an object space from the input image including the parallax information acquired at step S011. Specifically, the distance information acquirer 108 reconstructs images (viewpoint images) corresponding to the respective viewpoints from the input image and acquires the distance information of the object from pixel shift amounts of the object among the viewpoint images.

The reconstruction performed at step S012 is to acquire the distance information, which is different from a reconstruction process for producing an image to which the blur is added. A method of acquiring the distance information is not limited to the method of reconstructing the viewpoint images, but the distance information may be acquired by, for example, a DFF (depth from focus) which uses a plurality of images obtained by performing a plurality of image capturing operations while changing an in-focus position. In addition, the distance information may be acquired at a ranging position used for autofocus.

Then, at steps S013 and S014, the image processor 107 performs a shaping process. In this embodiment, the image processor 107 performs an image restoration process as the shaping process.

At step S013, the image restorer 110 of the image processor 107 acquires (selects or produces) an image restoration filter corresponding to the image pickup conditions (including the distance information of the object(s)) and the optical characteristic of at least one of the imaging optical system 102 and the lens array 103. A method of acquiring the image restoration filter will be described below.

Figure 15:
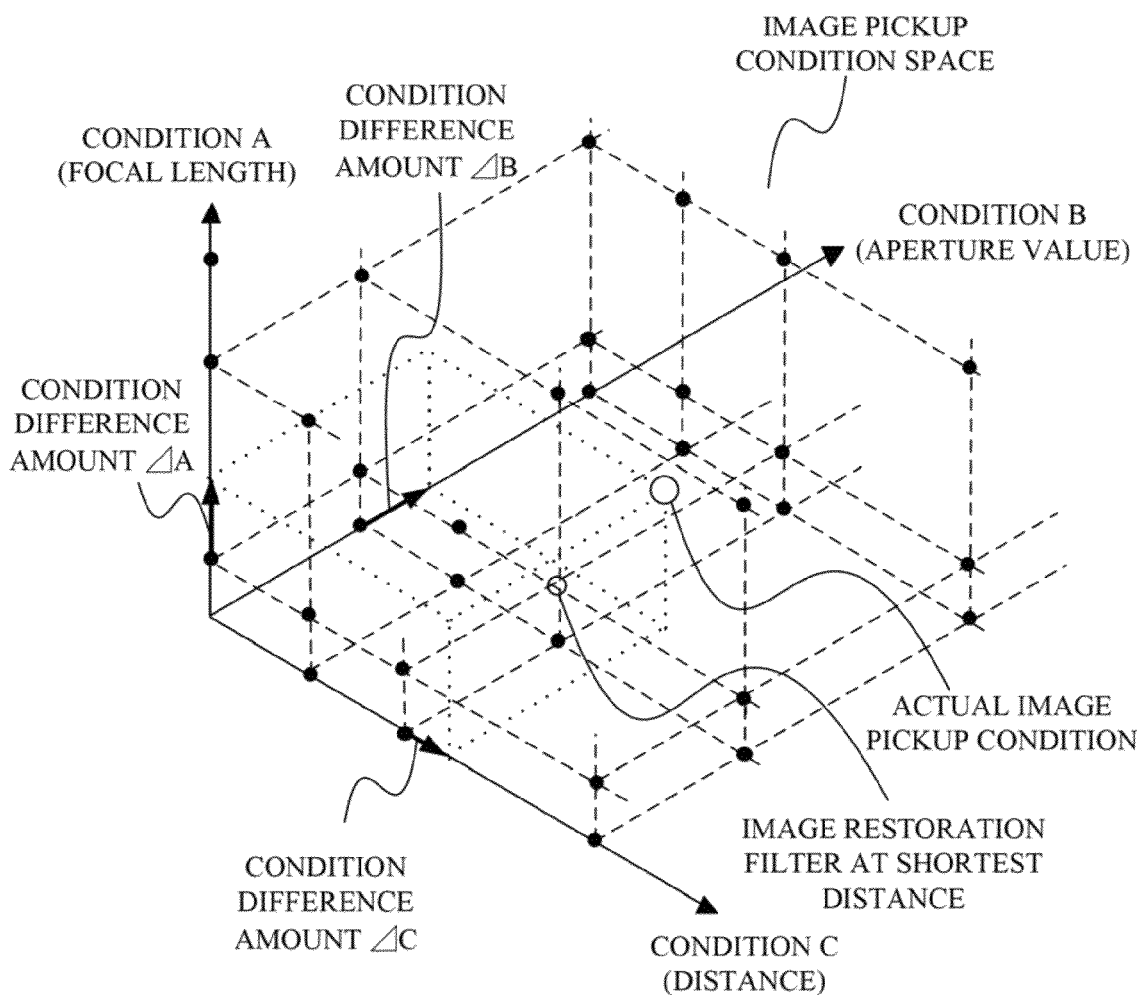
FIG. 15 shows selection of the image restoration filter.

FIG. 15 schematically shows the image restoration filters stored in the memory 106. The image restoration filters stored in the memory 106 are discretely arranged (stored) in an image pickup condition space having three image pickup condition axes: an axis of focal length (condition A); an axis of aperture diameter (condition B); and an axis of distance (condition C). Coordinates of respective points (shown by black circles) in the image pickup condition space indicate the image restoration filters stored in the memory 106. Although the image restoration filters shown in FIG. 15 are arranged at lattice points on lines orthogonal to the respective image pickup condition axes, the image restoration filter may be arranged off the lattice point. Moreover, the image pickup conditions may include a parameter other than the zoom position, aperture diameter and object distance, and number of the parameters of the image pickup conditions is not limited to three. That is, a four or more dimensional image pickup condition space including axes of four or more image pickup conditions may be provided to discretely arrange the image restoration filters therein.

In such an image pickup condition space where the stored image restoration filters are arranged, a large white circle in FIG. 15 denotes an actual image pickup condition. When an image restoration filter (hereinafter referred to as "a stored filter") stored in the memory 106 corresponding to or approximately corresponding to the actual image pickup condition exists, that stored filter is selected to be used for the image restoration process. When such a stored filter corresponding to or approximately corresponding to the actual image pickup condition does not exist, an image restoration filter is selected or produced by the following method.

First, distances between the actual image pickup condition and the image pickup conditions corresponding to two or more stored filters in the image pickup condition space are calculated. Then, a stored filter (denoted a small white circle in FIG. 15) corresponding to the image pickup condition located at a shortest distance among the calculated distances is selected. Selecting such a stored filter makes a difference between the actual image pickup condition and the image pickup condition corresponding to the stored filter (hereinafter, referred to as "a condition difference amount") minimum. Therefore, it is possible to reduce a correction amount for the stored filter and thereby to produce an image restoration filter close to an image restoration filter corresponding to the actual image pickup condition as much as possible. In addition, in the selection of the image restoration filter, it is possible to perform weighting depending on a direction in the image pickup condition space. That is, the selection of the image restoration filter may be performed by using a product of the distance in the image pickup condition space and the directional weight as an evaluation function.

Next, the condition difference amounts ΔA, ΔB and ΔC between the image pickup conditions A, B and C corresponding to the selected stored filter and the actual image pickup condition are calculated. Then, a condition correction coefficient is calculated on a basis of the condition difference amounts ΔA, ΔB and ΔC. Furthermore, the selected stored filter is corrected by using the condition correction coefficient. In this way, it is possible to produce an image restoration filter corresponding to the actual image pickup condition.

Moreover, another method may be used in which two or more image restoration filters whose image pickup conditions are close to the actual image pickup condition are selected and an interpolation process is performed using the condition difference amounts of the two or more image restoration filters to produce an image restoration filter appropriate for the actual image pickup state. The interpolation process may be performed by interpolation of the coefficients of corresponding taps of the image restoration filters by linear interpolation, polynomial interpolation, spline interpolation or the like.

Figure 2:
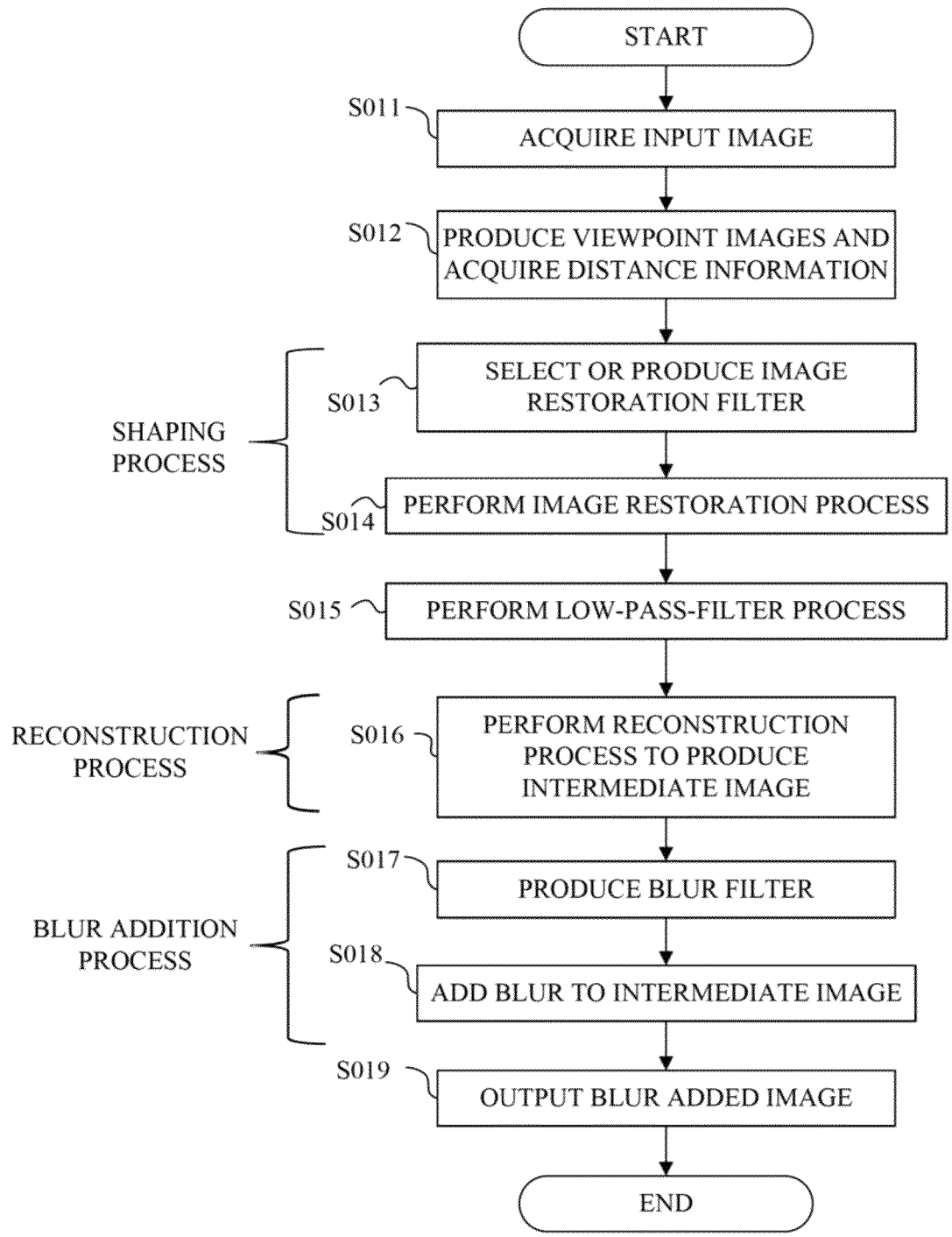
FIG. 2 is a flowchart showing a process performed by the image processing apparatus of Embodiment 1.

In FIG. 2, at step S014, the image processor 107 (image restorer 110) performs convolution of the image restoration filter acquired at step S103 on the input image to acquire a restored image.

Figure 8:
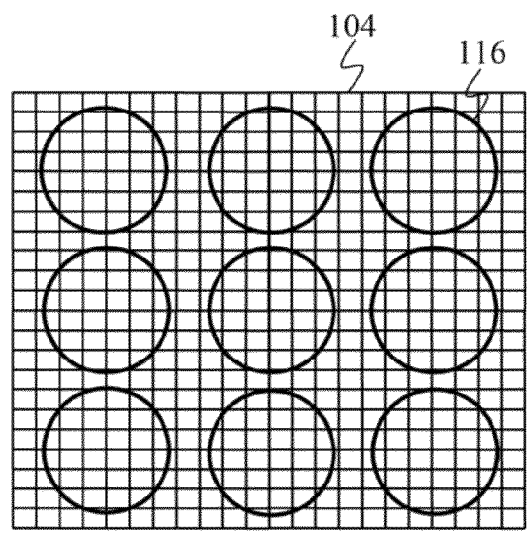
FIG. 8 shows areas of an image sensor where light rays passing through microlenses of a lens array enter.

FIG. 8 shows areas (ray reaching areas) 116 of the image sensor 104 where the light rays passing through the respective microlenses of the lens array 103 reach. In the image restoration process in this embodiment, the image restoration filter used for the convolution on the input image is changed depending on the ray reaching area 116 and the object distance. As a result, the phase degradation component of the input image is corrected to 0 which is a target value, and the amplitude degradation component is corrected so that amplitude components approximately coincide with each other between in the azimuth directions.

As described above, in this embodiment, the image restoration process is performed before the reconstruction process for producing the image (blur addition target image) to which the blur is added. The reason will be described below. The image restoration filter corresponding to each pixel before the reconstruction process is calculated from the optical transfer function of the imaging optical system 102 and the lens array 103. However, the reconstruction process performed to synthesize the pixels makes an optical system corresponding to the image after the reconstruction process unclear, which makes it impossible to calculate an appropriate optical transfer function. In other words, the reconstruction process before the image restoration process makes it impossible to perform the image restoration process for correcting changes in object image changes due to the aberration and the diffraction. Therefore, the image restoration process needs to be performed before the reconstruction process.

In FIG. 2, at step S015, the image processor 107 applies a low-pass filter to an area of the restored image corresponding to a distance at which aliasing of an angle component occurs, the low-pass filter being a filter corresponding to the distance. This low-pass filter process is performed because the aliasing of the angle component influences a shape of the defocus blur. However, the low-pass filter does not necessarily have to be applied before the reconstruction process, and in this case a blur addition process may be performed before the reconstruction process to reduce the influence of the aliasing of the angle component on the shape of the defocus blur.

Next, at step S016, the image reconstructor 109 of the image processor 107 performs the reconstruction process for producing the above-mentioned blur addition target image. At step S016, the image processor 107 (image reconstructor 109) performs the reconstruction process on the restored image to which the low-pass filter has been applied at step S015 to produce an intermediate image (viewpoint image corresponding to one viewpoint) as a reconstructed image. In the reconstruction process, the image processor 107 changes the in-focus position by using the distance information and performs weighting depending on the distance.

At steps S017 and S018, the blur adder 111 of the image processor 107 performs the blur addition process on the intermediate image.

Figure 7:
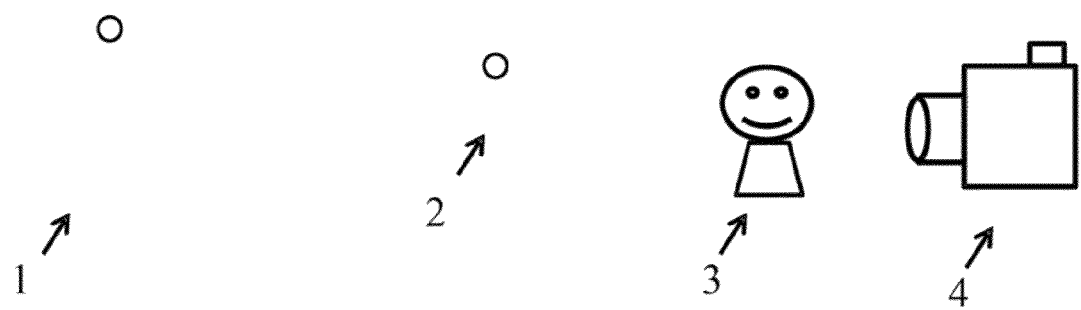
FIG. 7 shows an example of a captured scene.
Figure 9:
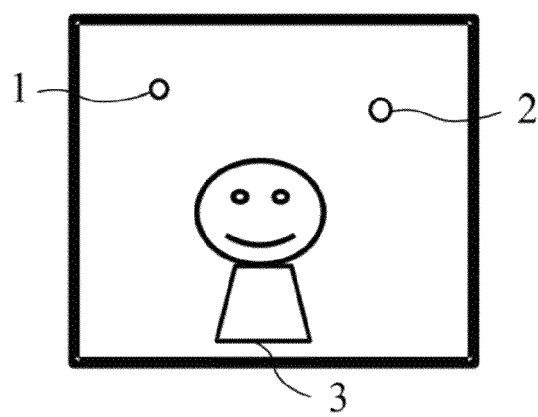
FIG. 9 shows a reconstructed image by a reconstruction process.

At step S017, the image processor 107 (blur adder 111) produces a blur function corresponding to the distance of each object included in the intermediate image. FIG. 7 shows an example of a captured scene. FIG. 9 shows an intermediate image produced by the reconstruction process from the input image acquired in the captured scene shown in FIG. 7. In this step, the blur functions respectively corresponding to the distances of objects 1, 2 and 3 shown in FIG. 9 are produced.

Figure 17A:
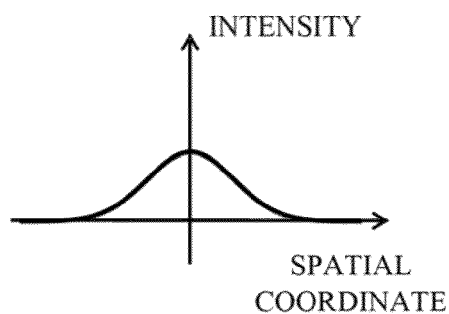
FIGS. 17A to 17C show examples of a blur function.
Figure 17B:
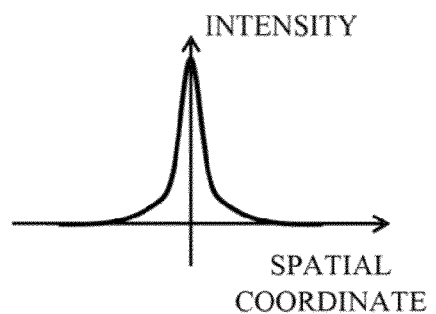
Figure 17C:
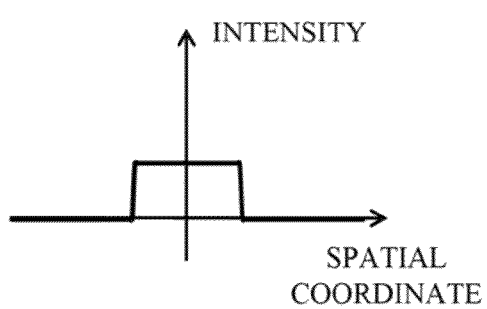

Examples of the blur function will be described. FIG. 17A shows a blur function as a Gaussian function, which expresses a blur whose intensity smoothly attenuates toward its periphery (as its space coordinate increases). FIG. 17B shows a blur function in which two types of Gaussian functions whose half-width values are different from each other are combined with each other, which expresses a blur whose central peak intensity is sharper than that in the blur function shown in FIG. 17A. FIG. 17C shows a blur function indicating an uneven blur. The blur function is not limited to those shown in FIGS. 17A to 17C, other blur functions may be used.

Figure 20:
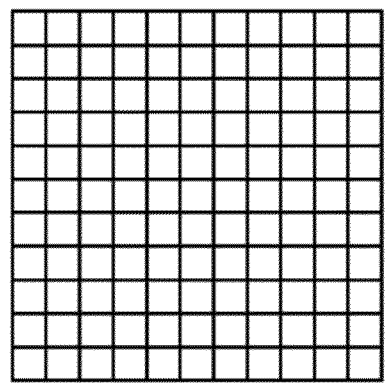
FIG. 20 shows a filter used in a shaping process or the blur addition process.

In this embodiment, the blur function is changed depending on the distance so that a size of the blur corresponds to an imaging optical system having an F-number which is specified. However, the definition of the size of the blur is not limited thereto. For example, the blur function may be changed so as to be proportional to a square of the distance from the in-focus position. Information on the blur function is used as each tap value of a blur filter as a two-dimensional filter shown in FIG. 20 at step S018.

Figure 10A:
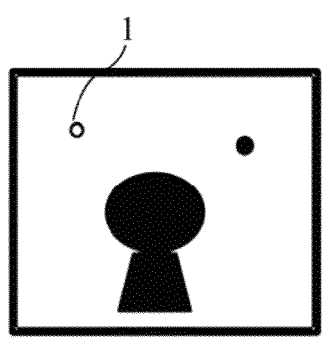
FIGS. 10A to 10D show a blur addition process.
Figure 10B:
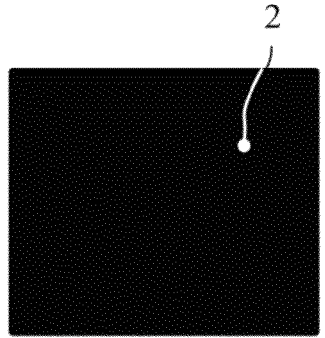
Figure 10C:
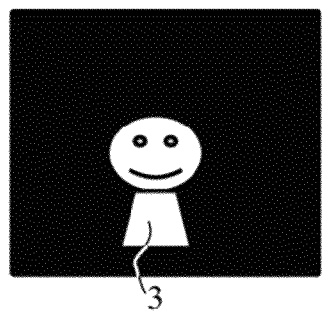

In FIG. 2, at step S018, the image processor 107 (blur adder 111) applies the blur filter to a target object image portion (target layer) to which the blur is added among one or more object image portions of the intermediate image. That is, the blur adder 111 performs convolution of the blur filter on the target layer. Specifically, as shown in FIGS. 10A, 10B and 10C, the blur adder 111 divides the intermediate image produced by the reconstruction process at step S016 after the image restoration process at step S014 into three layers. FIGS. 10A and 10B show background layers as the target layers, and FIG. 10C shows a main object layer.

Figure 10D:
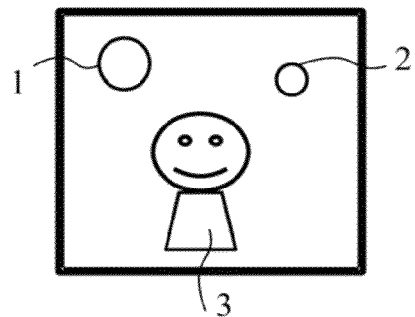

The blur adder 111 applies the blur filters corresponding to the respective background layers and acquired at step S016 to the background layers and thereby adds the blur thereto. When a plurality of images are synthesized, pixel values of their layers may be added, or a value of one layer or values of two or more layers may be used. The blur adder 111 combines the background layers to which the blur is thus added and the main object layer to provide the blur added image shown in FIG. 10D.

Although this embodiment described the case where the number of layers is three, the number of layers is not limited thereto, and may be one of two or four or more. In these cases, the same effect as described above can be obtained.

The blur addition process at steps S017 and S018 is an illustrative example, and other blur addition processes may be performed. For example, an blur addition process may be performed which divides the intermediate image shown in FIG. 9 into multiple image areas depending on the distance and performs convolution of different blur filters on the respective image areas. In addition, the blur function may be defined as the size of the blur and then pixel values of each layer may be averaged in an area corresponding to the size of the blur.

Moreover, although this embodiment described the case of performing the blur addition process after the reconstruction process, the reconstruction process may be performed after the blur addition process. In this case, the blur addition process can be substituted for the above-described low-pass filter process corresponding to the object distance, which needs to be performed before the reconstruction process. However, when the blur filter to be applied to the image having the parallax information before the reconstruction process is the same as the blur filter to add an intended blur, a same blur is added to respective parallax images, which makes the shape of the blur after the reconstruction process different from the shape of the intended blur. Thus, it is necessary to apply different blur filters to the respective areas (ray passing areas) of the pupil plane of the imaging optical system 102 which are divided by the lens array 103 to adjust the shapes of the blurs added to the respective parallax images. Alternatively, control of weighting for each light ray may be performed to adjust the shape of the blur in the reconstruction process.

At step S019, the image processor 107 outputs the blur added image obtained at step S018.

In this embodiment, the image restoration process (shaping process) is performed on an assumption that the blur addition process is performed. Therefore, in a case where the in-focus position is decided when the image restoration process is performed, the asymmetry of the degraded component may be corrected and the value of the MTF does not have to be increased.

As described above, this embodiment performs the shaping process to reduce the change (degradation) of the object shape due to the optical characteristics of the imaging optical system and the lens array before performing the reconstruction process and the blur addition process on the image having the parallax information, which enables producing a good blur-added image.

Although this embodiment described the case where the image restoration process is performed as the shaping process, the shaping process may include adjustment of luminance values between in the viewpoint images, estimation of a luminance value of a luminance saturated area and adjustment of the estimated luminance value of the luminance saturated area when the blur is added, which will be described in the following embodiment.

[Embodiment 2]

Figure 3:
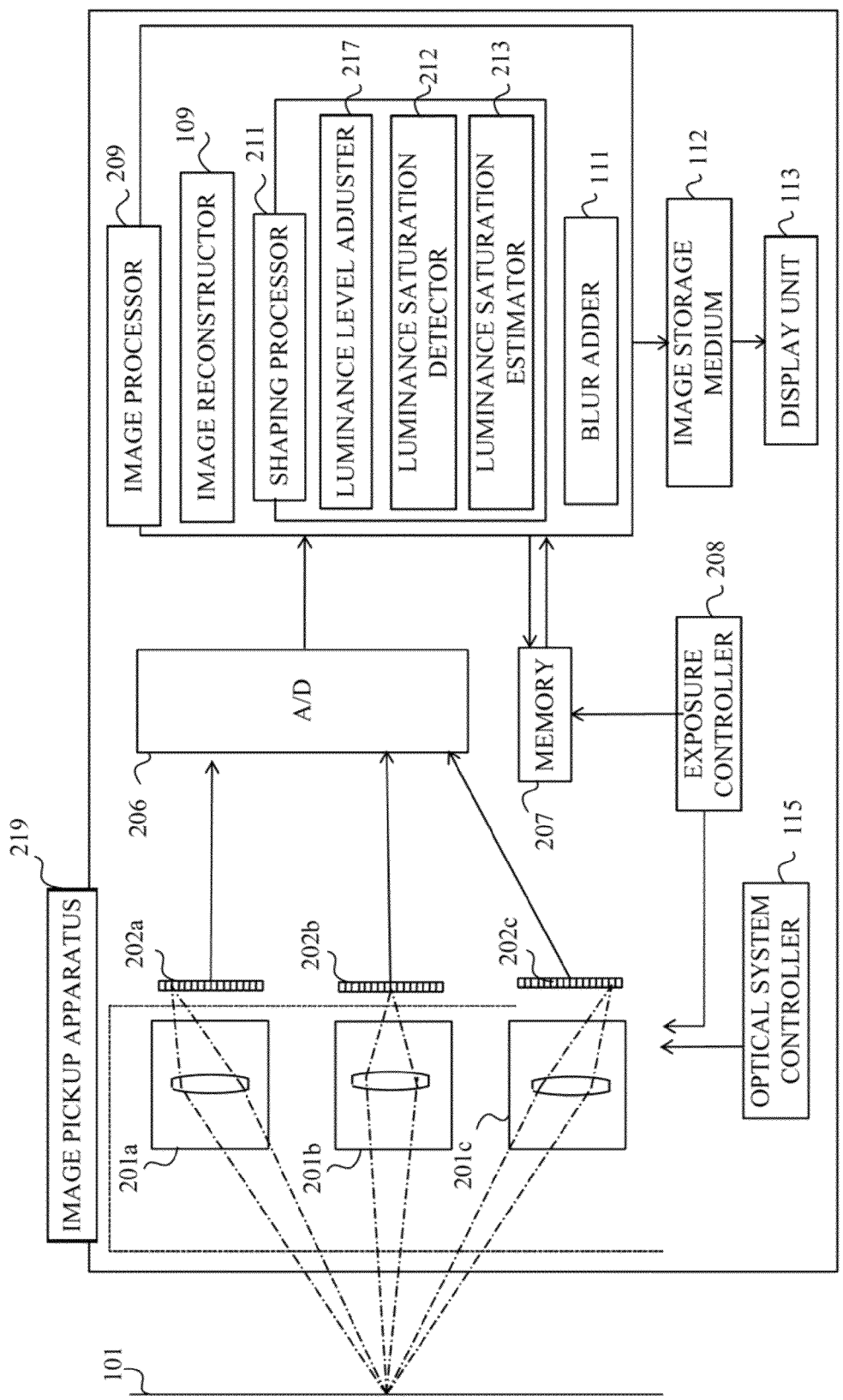
FIG. 3 is a block diagram showing a configuration of an image pickup apparatus including an image processing apparatus that is Embodiment 2 of the invention.

FIG. 3 shows a configuration of an image pickup apparatus 219 including an image processor 209 as an image processing apparatus that is a second embodiment (Embodiment 2) of the present invention. In FIG. 3, the same components as those in Embodiment 1 (FIG. 1) are denoted by the same reference numerals as those in Embodiment 1 and description thereof is omitted. The image pickup apparatus 219 in this embodiment includes multiple imaging optical systems and multiple image sensors corresponding thereto. In this embodiment, before the reconstruction process, a luminance estimation process to estimate a luminance value of a luminance saturated area and a luminance adjustment process to adjust luminance values of a plurality of viewpoint images (input images) are performed as a shaping process. That is, in this embodiment, the estimation of the luminance value of the luminance saturated area and the adjustment of the luminance values of the multiple viewpoint images are performed before the reconstruction process to reduce a lack of information in the luminance saturated area. The reason why the shaping process is performed before the reconstruction process will be described below.

In FIG. 3, reference numerals 201a to 201c denote the imaging optical systems, and reference numerals 202a to 202c denote the image sensors (in other words, image pickup pixels).

In this embodiment, an area including aperture diameters formed by pupil planes of the respective imaging optical systems 201a to 201c is defined as a synthesized aperture, and the synthesized aperture is defined as a pupil plane common to the imaging optical systems 201a to 201c. That is, in this embodiment, an image pickup system is configured which causes light rays from a same point in an object space to enter different image pickup pixels depending on ray passing areas of the (common) pupil plane of the imaging optical systems 201a to 201c.

Although this embodiment shows a case of including three imaging optical systems and three image sensors, it is enough that at least two imaging optical systems and at least one image sensor be included. When number of the image sensors is less than that of the imaging optical systems, it is enough that they are arranged so as to cause light rays from all the imaging optical systems to enter the image sensor(s).

An exposure controller 208 controls an aperture stop included in each of the imaging optical systems 201a to 201c to control an exposure amount. A memory 207 stores a plurality of input images produced by image capturing with different exposure amount of the imaging optical systems 201a to 201c with respect to an object plane 101 and information on the exposure amounts of the imaging optical systems 201a to 201c. The multiple input images are multiple viewpoint images whose viewpoints are mutually different.

The memory 207 may store a plurality of input images produced by continuous image capturing with changing an equally set exposure amounts of the imaging optical systems 201a to 201c and information on the exposure amounts corresponding to the input images.

In a case where at least one input image among the plurality of input images includes the luminance saturated area, the image including the luminance saturated area is an estimation target image whose luminance value is estimated. The information stored in the memory 207 is transmitted to an image processor 209.

A shaping processor 211 included in the image processor 209 detects, at a luminance saturation detector 212, the luminance saturated area in the input image including the luminance saturated area by using the information transmitted from the memory 207. Then, the shaping processor 211 estimates, at a luminance saturation estimator 213, estimates luminance value of an area corresponding to the luminance saturated area in each of the other images. Moreover, the shaping processor 211 adjusts, as a luminance level adjuster 217, the luminance values of the plurality of input images. The detection of the luminance saturated area and the estimation of the luminance values will be described in detail below. The blur adder 111 including in the image processor 209 performs the blur addition process.

Description will be made of an image process (image processing method) that is performed in this embodiment and produces a blur added image with reference to a flowchart shown in FIG. 4. The image processor 209 as a computer executes this image process according to an image processing program, which is a computer program.

At step S021, the image processor 209 acquires a plurality of input images (viewpoint images) by image capturing through the imaging optical systems 201a to 201c whose exposure amounts are mutually different. The image processor 209 may acquire such a plurality of input images with different exposure amounts by continuous image capturing with changing an equally set exposure amounts of the imaging optical systems 201a to 201c.

Figure 11:
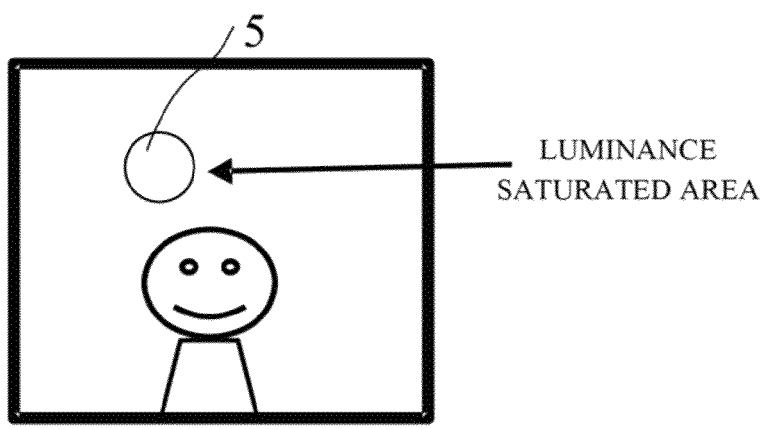
FIG. 11 shows a luminance saturated area.

At steps S022, S023 and S024, the image processor 209 performs the shaping process. At step S022, the image processor 209 (luminance saturation detector 212) selects at least one image including the luminance saturated area among the plurality of input images acquired at step S021 and detects the luminance saturated area in the selected image. FIG. 11 shows an image (hereinafter referred to as "a luminance saturated image") including a luminance saturated area 5 among the plurality of input images.

At step S023, the image processor 209 (luminance saturation estimator 213) estimates an original luminance value of the luminance saturated area 5 detected at step S022. Among the plurality of input images acquired at step S021, an image whose luminance value of an area corresponding to the luminance saturated area of the luminance saturated image is equal to or less than a saturation value is referred to as "an image W".

Figure 12A:
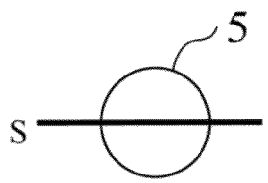
FIGS. 12A and 12B show a luminance estimation process.

The estimation of the luminance value will be described with reference to FIGS. 12A and 12B. FIG. 12A shows the luminance saturated area 5 shown in FIG. 11 and an area of the image W corresponding thereto.

Figure 12B:
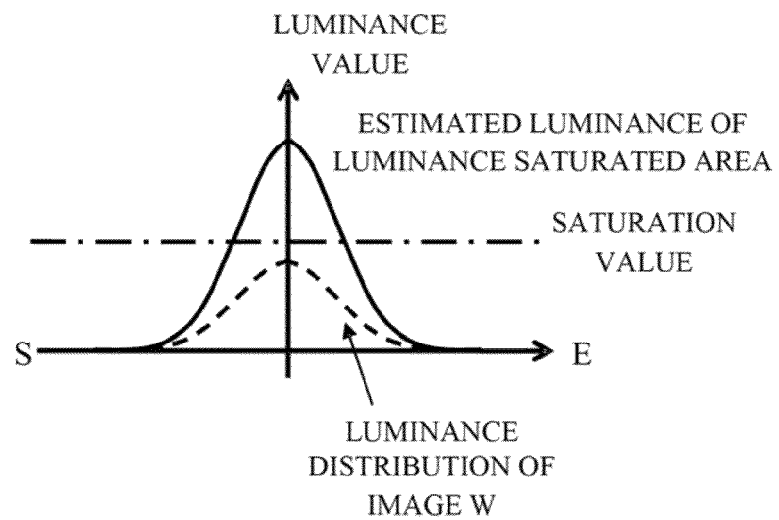

FIG. 12B shows a luminance distribution in an S-E section in FIG. 12A. The following expression (4) is used to estimate the luminance value of the luminance saturated image from the image W whose luminance is not saturated. That is, the luminance distribution of the image W is multiplied by a ratio of the exposure amount of the luminance saturated image to the exposure amount of the image W, which makes it possible to estimate the luminance distribution equal to or higher than the saturation value as shown by a solid line in FIG. 12B.

(Exposure amount of luminance saturated image/Exposure amount of image $W$)×Luminance distribution of image $W$=Estimated luminance distribution of luminance saturated image (4)

As a method of estimating the luminance value, a method may be used which compares areas whose luminances are not saturated in the luminance saturation image and the image W.

At step S024, the image processor 209 (luminance level adjuster 217) adjusts the luminance values (luminance levels) of the plurality of input images such that these luminance values are made equal to each other, on a basis of the estimated luminance value and the exposure amount for each input image (viewpoint image). Specifically, the image processor 209 selects any one of the input images, refers to the luminance value (including the estimated luminance value) of another image of the input images and multiplies the other image by a ratio of the exposure amount of the selected image and that of the other image to cause the luminance value of the other image to coincide with that of the selected image.

In this embodiment, the reason why the estimation of the luminance value of the luminance saturated area and the adjustment (equalization) of the luminance values among the plurality of input images (viewpoint images) are performed before the reconstruction process will be described. First, in a case where the luminance values of the plurality of input images with parallax are not equal to each other before the reconstruction process, the reconstruction process performed using the images with different exposure amounts results in production of an unnatural reconstructed image. In addition, in order to make the luminance value equal to that of the image not including the luminance saturated area before the reconstruction process, it is necessary to estimate the luminance value of the luminance saturated area of the luminance saturation image before the equalization of the luminance values. Therefore, it is necessary to estimate the luminance value of the luminance saturated area and adjust the luminance values of the plurality of input images to equalize them before the reconstruction process.

Figure 4:
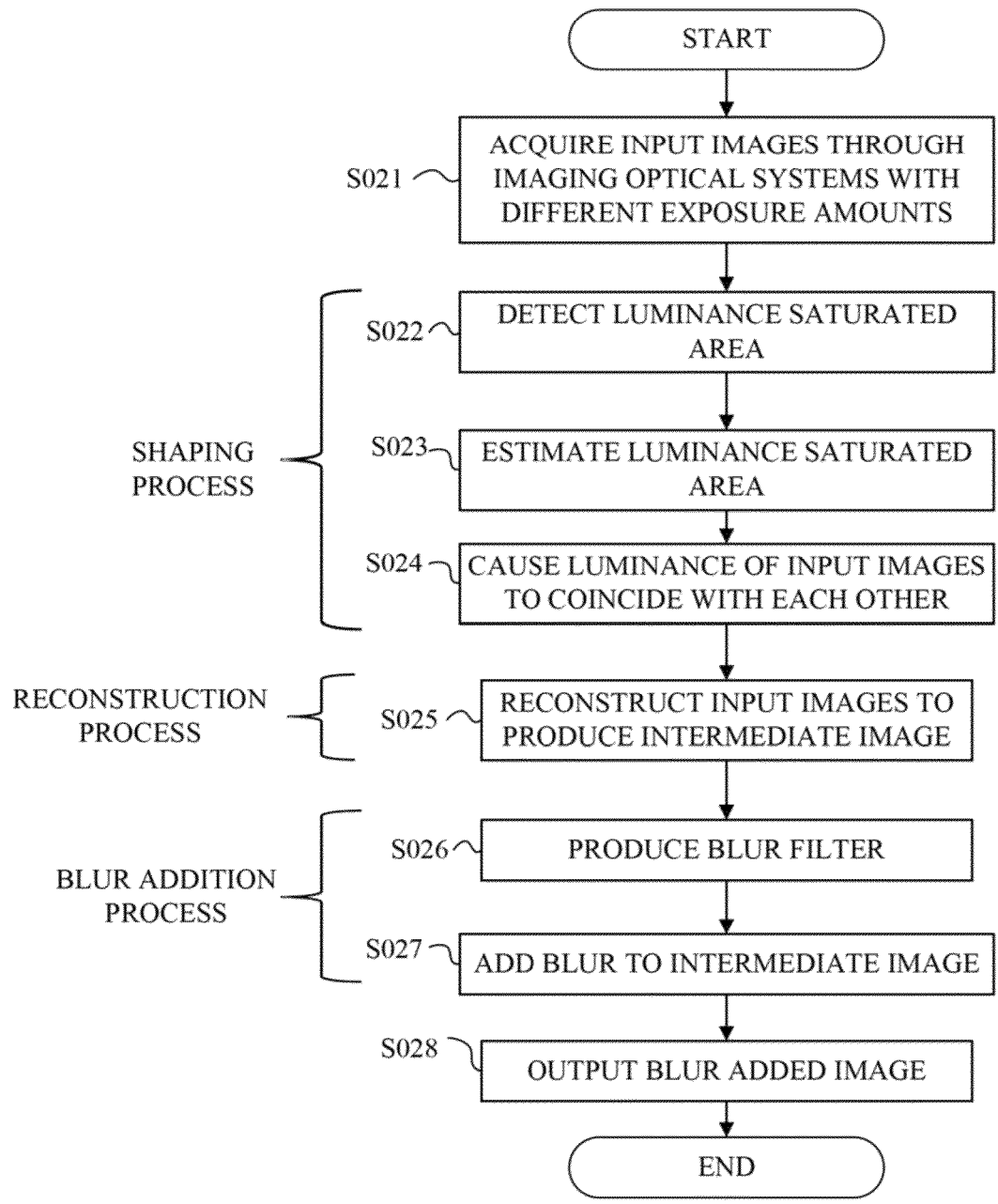
FIG. 4 is a flowchart showing a process performed by the image processing apparatus of Embodiment 2.

In FIG. 4, at step S025, the image processor 209 (image reconstructor 109) performs reconstruction on the viewpoint images whose luminance values have been adjusted to produce an intermediate image as one viewpoint image.

Then, at step S026, the image processor 209 (blur adder 111) produces a blur function, similarly to Embodiment 1. Then, at step S027, similarly to Embodiment 1, the blur adder 111 applies a blur filter with information of the blur function to the intermediate image to produce a blur added image. Finally, at step S028, the image processor 209 outputs the blur added image.

Figure 19A:
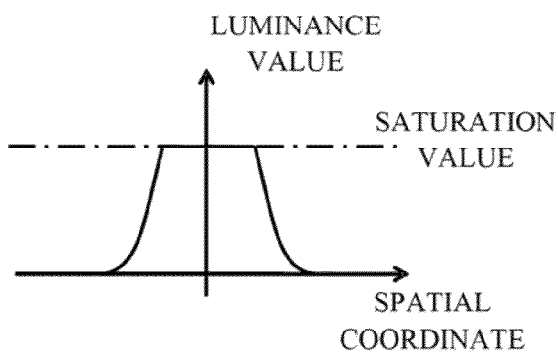
FIGS. 19A to 19C show problems when a blur is added to a luminance saturated area.
Figure 19B:
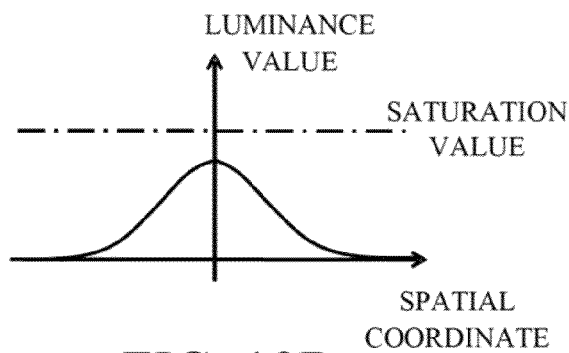
Figure 19C:
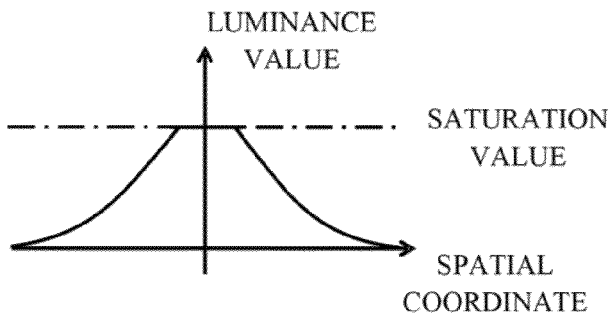

It is desirable that the luminance value (original luminance value) estimated in this embodiment be used for the image restoration process described in Embodiment 1. As shown in FIG. 19A, the luminance value of the luminance saturated area is constant and equal to the saturation value, unlike the original luminance distribution. When the image restoration process is performed in this state, it is impossible to obtain a correct restored image. Therefore, performing the image restoration process after the estimation of the original luminance value of the luminance saturated area enables providing the correct restored image.

According to this embodiment, since the estimation of the luminance value of the luminance saturated area and the adjustment of the luminance values between the multiple viewpoint images are performed before the reconstruction process, it is possible to reduce the lack of the information in the luminance saturated area, lack which may become a problem in the reconstruction process and the blur addition process.

[Embodiment 3]

Figure 5:
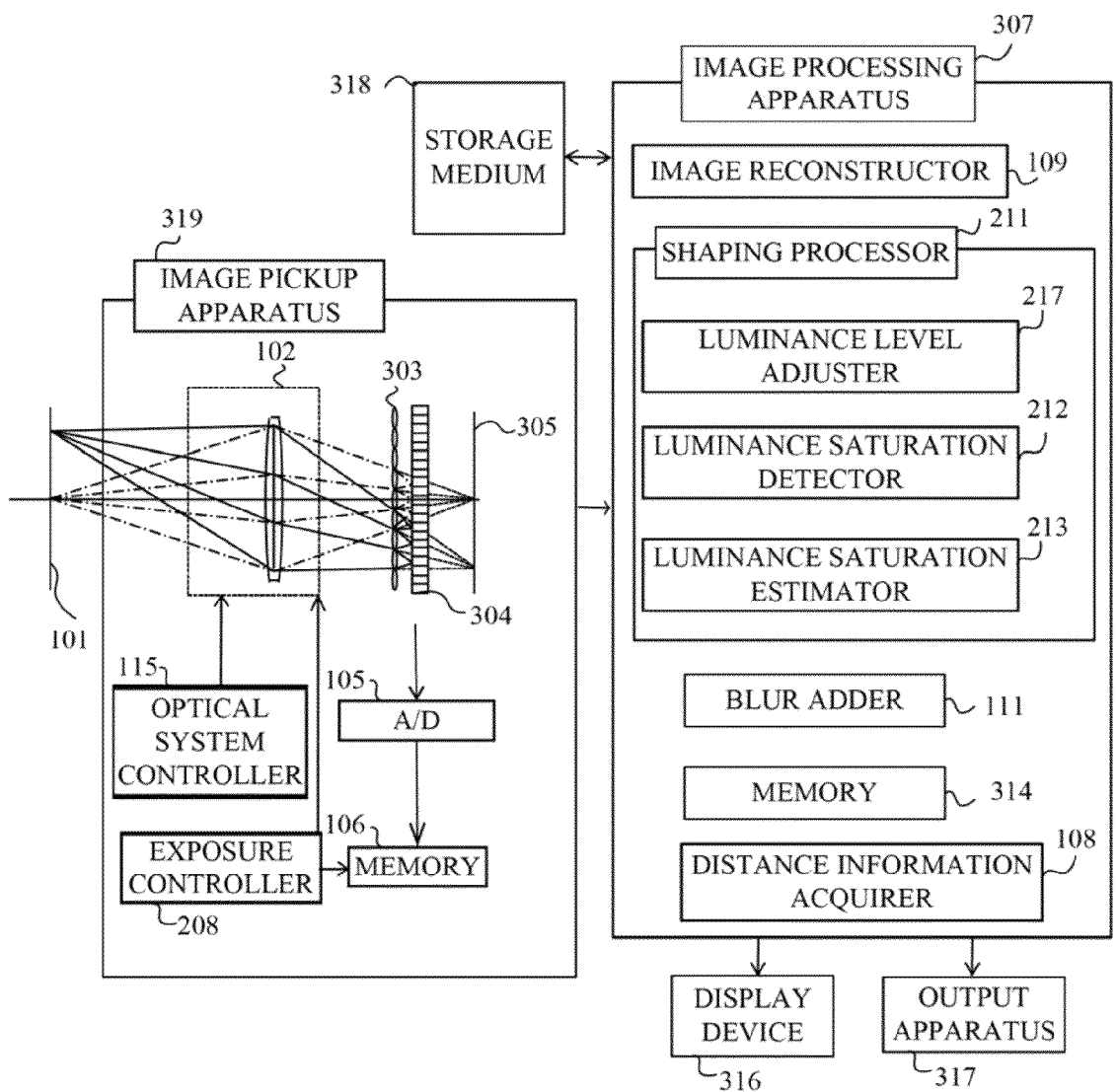
FIG. 5 is a block diagram showing a configuration of an image pickup apparatus including an image processing apparatus that is Embodiment 3 of the present invention.

FIG. 5 shows a configuration of an image processing apparatus 307 that is a third embodiment (Embodiment 3) of the present invention and a configuration of an image pickup apparatus 219 separate from the image processing apparatus 307. In FIG. 5, the same components as those in Embodiment 1 (FIG. 1) or Embodiment 2 (FIG. 3) are denoted by the same reference numerals as those in Embodiment 1, and description thereof are omitted. In this embodiment, similarly to Embodiment 2, the luminance estimation process for the luminance saturated area is performed before the reconstruction process (and the blur addition process), but the luminance level adjustment process is performed after the reconstruction process. The luminance value of the luminance saturated area is estimated before the reconstruction process for the same reason as that in Embodiment 2. The reason why the luminance level adjustment process is performed after the reconstruction process will be described below.

In FIG. 5, a lens array 303 is disposed on an object side further than an image side conjugate plane 305 of an imaging optical system 102 conjugate with an object plane 101. The lens array 303 provides a conjugate relation to between the image side conjugate plane 305 and an image sensor 304. Light rays from the object plane 101 pass through the imaging optical system 102 and the lens array 303 to enter different pixels (image pickup pixels) of the image sensor 304 depending on positions and angles of the light rays on the object plane 101. Thereby, information on an intensity distribution and directions (angles) of the light rays is acquired. When this information is acquired, an optical system controller 115 and an exposure controller 208 control the exposure amount of the imaging optical system 102.

In this embodiment, a plurality of input images with different exposure amounts are acquired by a plurality of image capturing operations. However, the plurality of input images with different exposure amounts may be acquired by one image capturing operation. In this case, the exposure controller 208 serves a filter having different light transmittances corresponding to microlenses of the lens array 303. The image sensor 304 acquires an image in which multiple small images whose viewpoints are mutually different are arranged.

Another configuration may be employed in which the lens array 303 is disposed on an image side further than the image side conjugate plane 305 and the image sensor 304 is disposed so as to be made conjugate with the image side conjugate plane 305 by the lens array 303.

The image processing apparatus 307 is a computer which performs the shaping process, the reconstruction process and the blur addition process. Image information processed by the image processing apparatus 307 is output to at least one of a storage medium 318, a display device 316 and an output device 317. The storage medium 318 is, for example, a semiconductor memory, a hard disk, or a server on a network. The display apparatus 316 is, for example, a liquid crystal display or a projector. The output device 317 is, for example, a printer. The display apparatus 316 is connected to the image processing apparatus 307, and the image information is transmitted to the display apparatus 316. A user can perform operations while viewing images on the display apparatus 316.

A memory 314 provided in the image processing apparatus 307 stores optical characteristics of the imaging optical system 102 and lens array 303 provided in the image pickup apparatus 319, image pickup conditions, and input images acquired from the image pickup apparatus 319. The image processing apparatus 307 includes the distance information acquirer 108 described in Embodiment 1 and the shaping processor 211 described in Embodiment 2 (however, the adjustment of the luminance level is performed after the reconstruction process in this embodiment).

Figure 6:
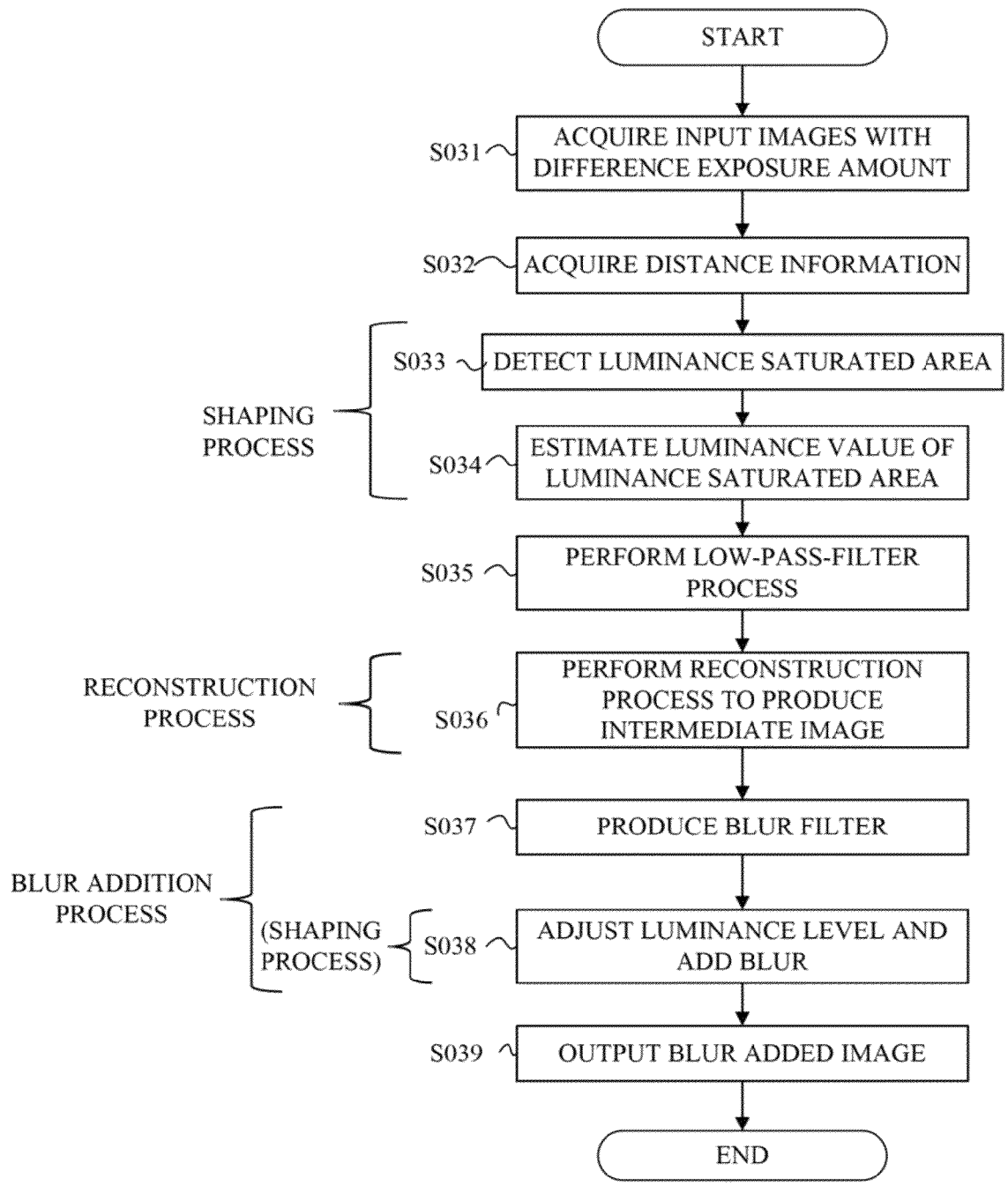
FIG. 6 is a flowchart showing a process performed by the image processing apparatus of Embodiment 3.

Description will be made of an image process (image processing method) that is performed in this embodiment and produces a blur added image from the input image, with reference to a flowchart shown in FIG. 6. The image processing apparatus 307 as a computer executes this image process according to an image processing program, which is a computer program.

At step S031, the image processing apparatus 307 acquires a plurality of input images produced by the image pickup apparatus 319 through a plurality of image capturing operations with different exposure amounts in a same image capturing range.

Then, at step S032, the image processing apparatus 307 (distance information acquirer 108) acquires, as described in Embodiment 1, the distance information of the object using the parallax information included in the plurality of input images or using other methods.

At steps S033 and S034, the image processing apparatus 307 performs the shaping process. At step S033, the image processing apparatus 307 (luminance saturation detector 212) detects a luminance saturated area of a luminance saturated image among the plurality of input images acquired at step S031.

Then, at step S034, the image processing apparatus 307 (luminance saturation estimator 213) estimates, as described in Embodiment 2, the original luminance value of the luminance saturated area. Then, at step S035, the image processing apparatus 307 (luminance saturation estimator 213) provides the estimated luminance value to the luminance saturated area of the luminance saturated image and then applies a low-pass filter to an area of the luminance saturated image corresponding to a distance at which aliasing of an angle component occurs, the low-pass filter being a filter corresponding to the distance.

Next, at step S036, the image processing apparatus 307 (image reconstructor 109) performs the reconstruction process to produce an intermediate image by using the input image subjected to the low-pass filter processing.

Then, at step S037, the image processing apparatus 307 (blur adder 111) produces a blur filter on a basis of the distance information of the object acquired at step S032, similarly to Embodiment 1.

Next, at step S038, the image processing apparatus 307 (luminance level adjuster 217) adjusts the luminance level of the luminance saturated area in the intermediate image and applies the blur filter to the intermediate image. It is desirable to perform the blur addition process after the luminance level adjustment process. The reason is that performing the luminance level adjustment process after the blur addition process cannot reproduce an accurate blur of the luminance saturated area generated by an imaging optical system with a small F-number. Performing the blur addition process after the luminance level adjustment process enables application of the blur filter after the estimated luminance value is reflected to the luminance value of the luminance saturated area. Thereby, after the convolution of the blur filter, a higher luminance value than the saturation value is reflected as the saturation value to the luminance value.

On the other hand, in a case of performing the blur addition process before the luminance level adjustment process, the convolution of the blur filter is first performed on the intermediate image. Then, in the blur added image, the luminance value of the luminance saturated area before the blur addition process is proportionally multiplied by a ratio of the luminance value of the luminance saturated area before the blur addition process and the estimated luminance value.

However, the luminance level adjustment process is not limited thereto, and the luminance value may be adjusted to a value higher or lower than the above-mentioned value. In addition, it is desirable that the luminance level be adjusted after the reconstruction process. The reason is that the luminance level can be adjusted arbitrary without reperforming the reconstruction process, which enables reduction of number of processes.

Finally, at step S039, the image processing apparatus 307 outputs the blur added image.

According to this embodiment, similarly to Embodiment 2, it is possible to reduce the lack of the information in the luminance saturated area, lack which may become a problem in the reconstruction process and the blur addition process. Moreover, it is possible to adjust the luminance level so as to reproduce a blur generated by an imaging optical system having a small F-number.

Furthermore, according to each of the above-described embodiments, since the shaping process is performed at an appropriate time for the reconstruction process and the blur addition process, a reconstructed image to which a good blur is added can be produced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2012-252839, filed on Nov. 19, 2012, which is hereby incorporated by reference herein in its entirety.

What is claimed is:

1. An image processing method comprising:
   acquiring an input image produced by an image pickup system including at least one imaging optical system and causing light rays from a same point in an object space to respectively enter different image pickup pixels depending on, of a pupil plane of the at least one imaging optical system, light ray passing areas through which the respective light rays pass;
   performing a shaping process including at least one of an image restoration process to restore a restoration target image on a basis of an optical transfer function of the image pickup system and a luminance estimation process to estimate a luminance value in a luminance saturated area in an estimation target image;
   performing a reconstruction process to reconstruct a new image different from the input image; and
   performing a blur addition process to add an image blur component to an addition target image,
   wherein the method performs the shaping process before the reconstruction process and the blur addition process.

2. An image processing method according to claim 1, wherein the shaping process includes a luminance adjustment process to adjust, by using the luminance value estimated by the luminance estimation process, luminance values of a plurality of the input images or of a plurality of viewpoint images produced from the input image.

3. An image processing method according to claim 1, wherein the method performs, in the shaping process, the image restoration process by using distance information of the object space.

4. An image processing method according to claim 1, wherein the method performs the reconstruction process by using distance information of the object space.

5. An image processing method according to claim 1, wherein the method performs the blur addition process by using distance information of the object space.

6. An image processing method according to claim 1, wherein the method performs the blur addition process after the reconstruction process.

7. An image processing apparatus performing an image process on an input image,
   the input image being produced by an image pickup system including at least one imaging optical system and causing light rays from a same point in an object space to respectively enter different image pickup pixels depending on, of a pupil plane of the at least one imaging optical system, light ray passing areas through which the respective light rays pass,
   the image process comprising:
   a shaping process including at least one of an image restoration process to restore a restoration target image on a basis of an optical transfer function of the image pickup system and a luminance estimation process to estimate a luminance value in a luminance saturated area in an estimation target image;
   a reconstruction process to reconstruct a new image different from the input image; and
   a blur addition process to add an image blur component to an addition target image,
   wherein the image process performs the shaping process before the reconstruction process and the blur addition process.

8. An image pickup apparatus comprising:
   an image pickup system including at least one imaging optical system and configured to cause light rays from a same point in an object space to respectively enter different image pickup pixels depending on, of a pupil plane of the at least one imaging optical system, light ray passing areas through which the respective light rays pass; and
   an image processing apparatus configured to perform an image process on an input image produced by the image pickup system,
   wherein the image process comprising:
   a shaping process including at least one of an image restoration process to restore a restoration target image on a basis of an optical transfer function of the image pickup system and a luminance estimation process to estimate a luminance value in a luminance saturated area in an estimation target image;
   a reconstruction process to reconstruct a new image different from the input image; and
   a blur addition process to add an image blur component to an addition target image,
   wherein the image process performs the shaping process before the reconstruction process and the blur addition process.

9. A non-transitory storage medium storing an image processing program as a computer program to cause a computer to perform an image process on an input image,
   the input image being produced by an image pickup system including at least one imaging optical system and causing light rays from a same point in an object space to respectively enter different image pickup pixels depending on, of a pupil plane of the at least one imaging optical system, light ray passing areas through which the respective light rays pass,
   the image process comprising:
   a shaping process including at least one of an image restoration process to restore a restoration target image on a basis of an optical transfer function of the image pickup system and a luminance estimation process to estimate a luminance value in a luminance saturated area in an estimation target image;
   a reconstruction process to reconstruct a new image different from the input image; and a blur addition process to add an image blur component to an addition target image,
wherein the image process performs the shaping process before the reconstruction process and the blur addition process.

* * * * *